(12) United States Patent
Ash et al.

(10) Patent No.: US 9,811,474 B2
(45) Date of Patent: Nov. 7, 2017

(54) DETERMINING CACHE PERFORMANCE USING A GHOST CACHE LIST INDICATING TRACKS DEMOTED FROM A CACHE LIST OF TRACKS IN A CACHE

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Juan A. Yanes, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/928,948

(22) Filed: Oct. 30, 2015

(65) Prior Publication Data
US 2017/0124001 A1     May 4, 2017

(51) Int. Cl.
*G06F 12/12* (2016.01)
*G06F 13/00* (2006.01)
*G06F 12/128* (2016.01)

(52) U.S. Cl.
CPC ...... *G06F 12/128* (2013.01); *G06F 2212/621* (2013.01); *G06F 2212/69* (2013.01)

(58) Field of Classification Search
CPC ...... G06F 12/00; G06F 12/08; G06F 12/0804; G06F 12/0806; G06F 12/0808; G06F 12/0811
USPC ......... 711/100, 117, 118, 154, 200
See application file for complete search history.

(56) References Cited

U.S. PATENT DOCUMENTS

| | | | |
|---|---|---|---|
| 5,123,099 A * | 6/1992 | Shibata | G06F 11/1666 711/120 |
| 6,493,810 B1 | 12/2002 | Pang et al. | |
| 7,752,395 B1 * | 7/2010 | Fair | G06F 12/0866 711/133 |
| 8,850,122 B2 | 9/2014 | Chockler et al. | |

(Continued)

OTHER PUBLICATIONS

T. Saemundsson, et al. "Dynamic Performance Profiling of Cloud Caches", ACM, 2014, pp. 14.

(Continued)

*Primary Examiner* — Tuan Thai
(74) *Attorney, Agent, or Firm* — David W. Victor; Konrad Raynes Davda & Victor LLP

(57) ABSTRACT

Provided are a computer program product, system, and method for determining cache performance using a ghost cache list. Tracks in the cache are indicated in a cache list. A track demoted from the cache is indicated in a ghost cache list in response to demoting the track in the cache. The demoted track is not indicated in the cache list. During caching operations, information is gathered on a number of cache hits comprising accesses to tracks indicated in the cache list and a number of ghost cache hits comprising accesses to tracks indicated in the ghost cache list. The gathered information on the cache hits and the ghost cache hits is used to generate information on cache performance improvements that would occur if the cache was increased in size to cache tracks in the ghost cache list.

20 Claims, 7 Drawing Sheets

(56) References Cited

U.S. PATENT DOCUMENTS

| | | | |
|---|---|---|---|
| 2003/0088739 A1* | 5/2003 | Wilkes | G06F 12/0888 711/133 |
| 2003/0188104 A1* | 10/2003 | Sullivan | G06F 12/0897 711/119 |
| 2004/0193803 A1 | 9/2004 | Mogi et al. | |
| 2006/0174067 A1* | 8/2006 | Soules | G06F 12/0804 711/135 |
| 2010/0076805 A1* | 3/2010 | Batsakis | G06F 9/505 705/35 |
| 2012/0089782 A1* | 4/2012 | McKean | G06F 12/0804 711/122 |
| 2013/0111133 A1* | 5/2013 | Benhase | G06F 12/0897 711/122 |
| 2013/0138889 A1 | 5/2013 | Chockler et al. | |
| 2015/0046654 A1 | 2/2015 | Soundararajan et al. | |
| 2015/0378892 A1* | 12/2015 | Tajima | G06F 9/45558 711/118 |
| 2016/0342518 A1* | 11/2016 | Park | G06F 12/0811 |
| 2017/0124000 A1 | 5/2017 | Ash et al. | |

OTHER PUBLICATIONS

List of Patents or Patent Applications Treated as Related, dated Oct. 30, 2015, pp. 2.
U.S. Appl. No. 14/928,926, filed Oct. 30, 2015.
Office Action dated Feb. 13, 2017, pp. 19, for U.S. Appl. No. 14/928,926, filed Oct. 30, 2015.
Response dated May 15, 2017, pp. 13, to U.S. Appl. No. 14/928,926, filed Oct. 30, 2015.
U.S. Appl. No. 15/629,249, filed Jun. 21, 2017.
List of IBM Patents or Patent Applications Treated as Related, dated Jun. 20, 2017, pp. 2.
Notice of Allowance dated Jul. 7, 2017, pp. 15, for U.S. Appl. No. 14/928,926, filed Oct. 30, 2015.

* cited by examiner

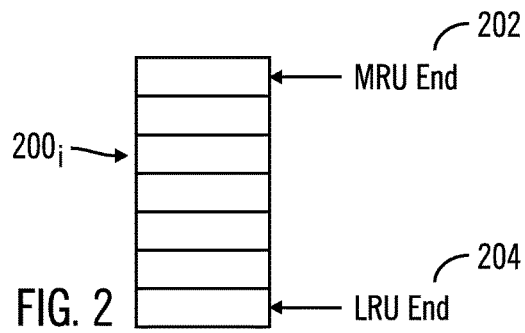
FIG. 2
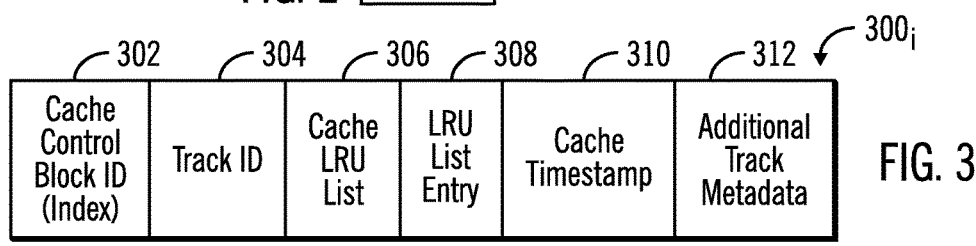
Cache Control Block
FIG. 3
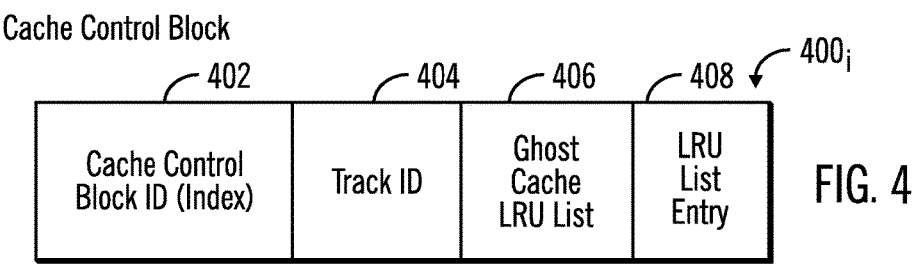
Ghost Cache Control Block
FIG. 4
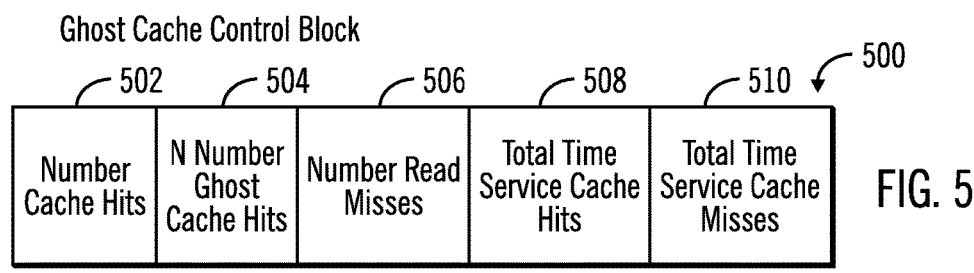
Gathered Cache Access Statistics
FIG. 5
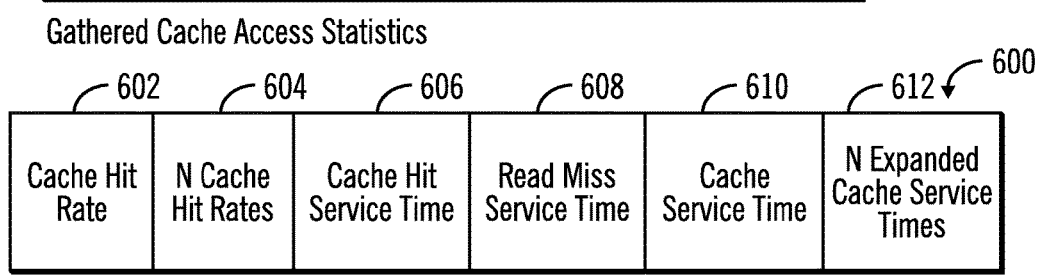
Calculated Cache Access Statistics    FIG. 6

| Cache Level | Cache Service Time | Amount Memory to Add |
|---|---|---|
| Current | 4ms | 0 |
| 1 | 3.5ms | 128GB |
| 2 | 3.2 | 256GB |
| 3 | 2.9 | 384GB |
| 4 | 2.7 | 512GB |

FIG. 9

DETERMINING CACHE PERFORMANCE USING A GHOST CACHE LIST INDICATING TRACKS DEMOTED FROM A CACHE LIST OF TRACKS IN A CACHE

BACKGROUND OF THE INVENTION

1. Field of the Invention

The present invention relates to a computer program product, system, and method for determining cache performance using a ghost cache list indicating tracks demoted from a cache list of tracks in a cache.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

There is a need for improved techniques for determining an amount of cache to add to a computing system.

SUMMARY

Provided are a computer program product, system, and method for determining cache performance using a ghost cache list. Tracks in the cache are indicated in a cache list. A track demoted from the cache is indicated in a ghost cache list in response to demoting the track in the cache. The demoted track is not indicated in the cache list. During caching operations, information is gathered on a number of cache hits comprising accesses to tracks indicated in the cache list and a number of ghost cache hits comprising accesses to tracks indicated in the ghost cache list. The gathered information on the cache hits and the ghost cache hits is used to generate information on cache performance improvements that would occur if the cache was increased in size to cache tracks in the ghost cache list.

BRIEF DESCRIPTION OF THE DRAWINGS

FIG. 2 illustrates an embodiment of a Least Recently Used (LRU) list.

FIG. 3 illustrates an embodiment of a cache control block.

FIG. 4 illustrates an embodiment of a ghost cache control block.

FIG. 5 illustrates an embodiment of gathered cache access statistics.

FIG. 6 illustrates an embodiment of calculated cache access statistics.

FIG. 9 illustrates an embodiment of information on cache service times and memory amounts to add to reach expanded cache service times.

DETAILED DESCRIPTION

System administrators and users may want to determine the benefits of increasing cache size to improve cache hit service times for a particular system. The amount of improvement would be better determined if it could be based on the actual working conditions of the system to which the memory is to be added as opposed to a hypothetical or benchmark system. In this way, a system administrator could have better assurance of the benefits of adding memory to the cache of their particular managed system.

Described embodiments provide techniques to determine the improvement in cache performance that would occur for adding different levels of cache by maintaining ghost cache lists for the different levels of cache being considered. Each cache level indicates an increasing amount of memory to add to the cache, and performance for adding the different levels of cache is tracked using the ghost cache lists for the cache levels. When a track is demoted from the cache, the track is then added to a ghost cache list so that a number of hits to a track on a ghost cache list can be used to determine a cache hit rate and cache performance that would occur if memory was added of sufficient size to store the tracks indicated in the different levels of ghost cache lists. This allows the system to gather actual cache performance improvements in the system that would be experienced if the cache size was increased to accommodate the tracks indicated in different levels of ghost cache lists.

Figure 1:
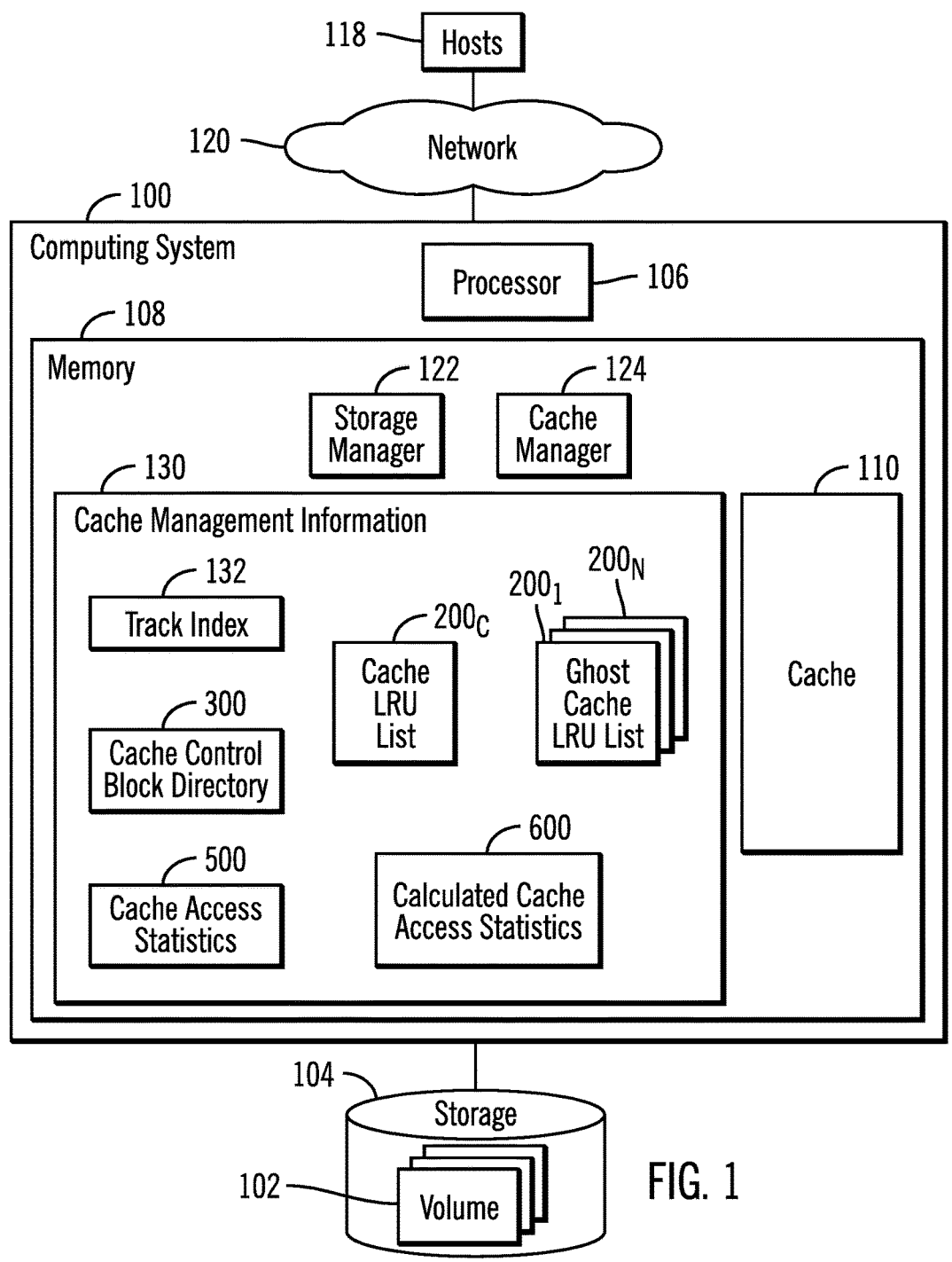
FIG. 1 illustrates an embodiment of a computing environment.

FIG. 1 illustrates an embodiment of a computing environment. A computing system 100 accesses data in volumes 102 (e.g., Logical Unit Numbers, Logical Devices, Logical Subsystems, etc.) configured in a storage 104. The computing system 100 includes a processor 106 and a memory 108, including a cache 110 to cache data for the storage 104. The processor 106 may comprise one or more central processing units (CPUs) or a group of multiple cores on a single CPU. The cache 110 buffers data requested by processes within the computing system. Alternatively, the computing system 100 may comprise a storage controller that processes Input/Output (I/O) access requests for tracks in the storage 104 from hosts 118 connecting to the computing system 100 (storage controller) over a network 120.

The memory 108 further includes a storage manager 122 and cache manager 124. The storage manager 122 manages access requests from internal processes in the computing system 100 and/or from hosts 118 for tracks in the storage 104. The cache manager 124 maintains accessed tracks in the cache 110 for future read access to the tracks to allow the accessed tracks to be returned from the faster access cache 110 instead of having to retrieve from the storage 104. A track may comprise any unit of data configured in the storage 104, such as a track, Logical Block Address (LBA), etc., which is part of a larger grouping of tracks, such as a volume, logical device, etc.

The cache manager 124 maintains cache management information 130 in the memory 108 to manage read (unmodified) and write (modified) tracks in the cache 110. The cache management information 130 may include a track index 132 providing an index of tracks in the cache 110 to cache control blocks in a control block directory 300; a cache Least Recently Used (LRU) list $200_C$ for tracks in the cache 110; and one or more ghost LRU lists $200_1 \ldots 200_N$ to indicate tracks that could have been stored in the cache 110 if additional memory space was added to the cache to store the tracks indicated in the ghost LRU lists $200_1 \ldots 200_N$. The control block directory 300 includes the cache control blocks, where there is one cache control block for each track in the cache 110 providing metadata on the track in the cache 110. The track index 132 associates tracks with the cache control blocks providing information on the tracks in the cache 110. Upon determining that the cache LRU list $200_C$ is full or has reached a threshold level, the LRU list $200_C$ is used to determine tracks to demote.

In one embodiment, there may only be cache control blocks 300 for the tracks in the cache 110 and no cache control blocks are allocated for tracks indicated in the ghost LRU lists $200_1 \ldots 200_N$. A track indicated in the ghost LRU lists $200_1 \ldots 200_N$ is not stored in the cache 110. In an alternative embodiment, the cache control block directory 300 may maintain ghost cache control blocks for tracks indicated in the ghost LRU lists $200_1 \ldots 200_N$ even though they are not stored in the cache 110. In one such embodiment using ghost cache control blocks for tracks indicated in the ghost LRU lists $200_1 \ldots 200_N$, the cache control blocks used for tracks in the ghost LRU lists $200_1 \ldots 200_N$, may be the same as those used for tracks in the cache 110, such as shown for FIG. 3, without information specific to the track being maintained in the cache 110. In a still further alternative embodiment, the cache control blocks used for tracks in the ghost cache LRU lists $200_1 \ldots 200_N$ may have fewer fields and less information than those for tracks maintained in the cache 110, such as shown in FIG. 4. In such embodiments, ghost cache control blocks for tracks indicated in the ghost cache LRU lists $200_1 \ldots 200_N$ may only maintain information about the ghost cache LRU list $200_1 \ldots 200_N$ where the track are indicated. For instance, for a track in the cache 110, a cache control block may require 256 bytes for a 4K block, but a ghost cache control block for a track only indicated in one of the ghost cache LRU lists $200_1 \ldots 200_N$ may only comprise 20 bytes.

During caching operations, the cache manager 124 may gather for specific periods of time cache access statistics 500 on access to tracks in the cache 110 indicated in the cache LRU list $200_C$ and tracks indicated in the ghost cache LRU lists $200_1 \ldots 200_N$, which are not stored in the cache 110. The cache manager 124 may further calculate calculated cache access statistics 600 for the currently used cache 110 and for a hypothetical expanded cache having space to store tracks indicated in one or more ghost cache LRU cache lists $200_1 \ldots 200_N$. For instance, if there are N tiers or levels of cache that are being considered, then there are N ghost cache LRU lists $200_1 \ldots 200_N$ and N performance measurements may be calculated. The ghost cache level i performance measurement for i=1 to N is based on the performance if the cache 110 is expanded to accommodate the tracks indicated in the ghost LRU lists 1 through i. Each of the N ghost cache LRU lists $200_1 \ldots 200_N$ may have the same number of track entries. This allows one to compare how cache performance would improve if different amounts of memory are added to the cache 110. For instance, each cache level may add a fixed amount of memory space, where each increasing level i may add i times the fixed amount of memory space, e.g., 128 GB. Alternatively, the levels may correspond to variable amounts of memory space to be added.

Providing information on cache performance improvements for adding different amounts of memory informs administrators on specific improvements that could be realized for adding specific amounts of memory.

In the described embodiments, the lists $200_C$ and $200_1 \ldots 200_N$ comprise LRU lists. In alternative embodiments, the lists $200_C$ and $200_1 \ldots 200_N$ may comprise other types of lists to organize indication of tracks in the cache 110.

The storage manager 122 and cache manager 124 are shown in FIG. 1 as program code loaded into the memory 108 and executed by the processor 106. Alternatively, some or all of the functions may be implemented in hardware devices in the storage controller 104, such as in Application Specific Integrated Circuits (ASICs).

The storage 104 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 108 may comprise a suitable volatile or non-volatile memory devices, including those described above.

The network 120 may comprise a Storage Area Network (SAN), a Local Area Network (LAN), a Wide Area Network (WAN), the Internet, and Intranet, etc.

FIG. 2 illustrates an embodiment of one of the LRU lists $200_i$, such as LRU cache lists $200_C$ and $200_1 \ldots 200_N$, as having a most recently used (MRU) end 202 identifying a track most recently added to the cache 110 or most recently accessed in the cache 110 and a least recently used (LRU) end 204 from which the track identified at the LRU end 204 is selected to demote from the cache 110. The LRU end 204 points to a track identifier, such as a track identifier address or a cache control block index for the track, of the track that has been in the cache 110 the longest for tracks indicated in that list $200_A$. The ghost cache LRU lists $200_1 \ldots 200_N$ identify tracks that could have been stored in the cache if the space was added to the cache 110 to store the tracks indicated in the ghost cache LRU lists $200_1 \ldots 200_N$.

FIG. 3 illustrates an embodiment of a cache control block $300_i$ for one of the tracks in the cache 110, including, but not limited to, a cache control block identifier 302, such as an index value of the cache control block $300_i$; a track ID 304 of the track in the storage 104; the cache LRU list 306 in which the cache control block $300_i$ is indicated; an LRU list entry 308 at which the track is indicated; a cache timestamp 310 indicating a time the track was added to the cache 110 and indicated on the LRU list 304; and additional track metadata 312 typically maintained for tracks stored in the cache 110.

FIG. 4 illustrates an embodiment of ghost cache control block $400_i$ that may be maintained for a track indicated in the ghost cache LRU lists $200_1 \ldots 200_N$, but not stored in the cache 110. The ghost cache control block $400_i$ includes fields 402, 404, 406, and 408 having the same type of information in fields 302, 304, 306, 308, respectively, in the cache control block $300_i$, but providing information on the ghost cache LRU list 406 and an entry 408 in the ghost cache LRU list entry for the track. The cache control block directory 300 may include cache $300_i$ and ghost $400_i$ cache control blocks.

FIG. 5 illustrates an embodiment of gathered access statistics 500 the cache manager 124 manager gathers periodically during caching operations, including a number of cache hits 502 comprising access requests to tracks indicated in the cache LRU list $200_C$ in the cache 110; an N number of ghost cache hits 504 comprising access requests to tracks indicated in the N ghost cache LRU list $200_1$ through $200_N$ that are not in the cache 110, where N is one or more; a number of read misses 506 indicating a number of access requests to tracks not in the cache 110; total time service cache hits 508 indicating a total accumulated time to service access requests when the track is in the cache 110; and a total time to service cache misses 510 indicating a total accumulated time to access requested tracks not in the cache 110 from the storage 104 to return to a request.

FIG. 6 illustrates an embodiment of calculated cache access statistics 600 calculated from the gathered access statistics 500, including a cache hit rate 602 comprising the number of cache hits 502 divided by total cache accesses during the measured time period; N cache hit rates 604, where cache hit rate $604_i$ for the ith ghost cache LRU list comprises the number of accesses to tracks indicated in the ghost cache list $200_i$ divided by total cache accesses during the measurement time period; a cache hit service time 606 comprising the total time service cache hits 508 divided by the number cache hits 502; read miss service time 608 comprising a total time service cache misses 510 divided by the number of read misses 506; a cache service time 610 comprising an average service time based on time to service cache hits and misses using the cache 110; and for each of the N ghost cache LRU lists $200_i$, for i equals 1 through N, an estimated expanded cache service time $612_i$ comprising a service time based on time to service cache hits and misses if the cache 110 was expanded to include space to store tracks indicated in LRU cache lists $200_1$ through $200_i$.

Figure 7A:
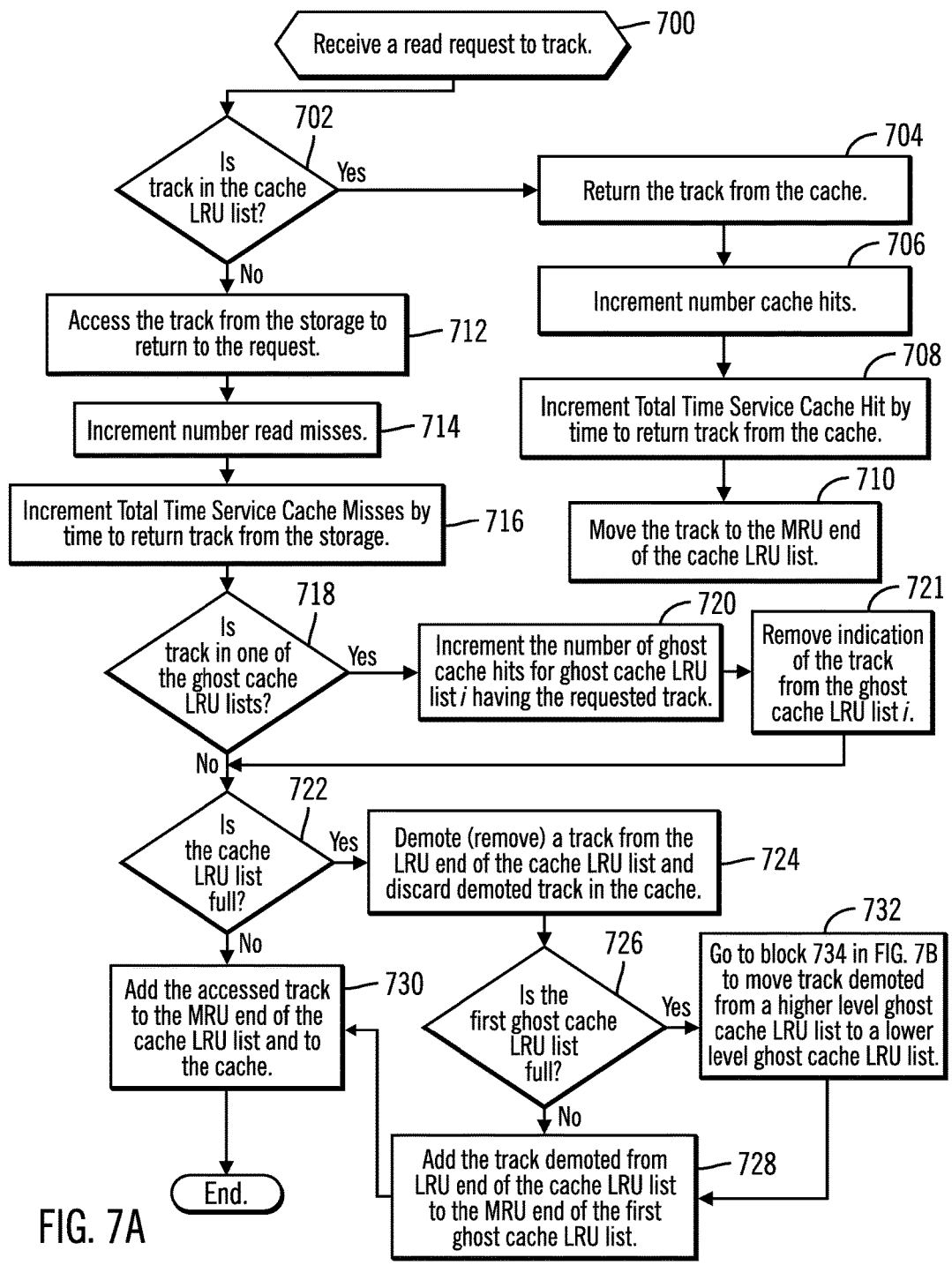
FIGS. 7A and 7B illustrate an embodiment of an operation to process a read request to a track.
Figure 7B:
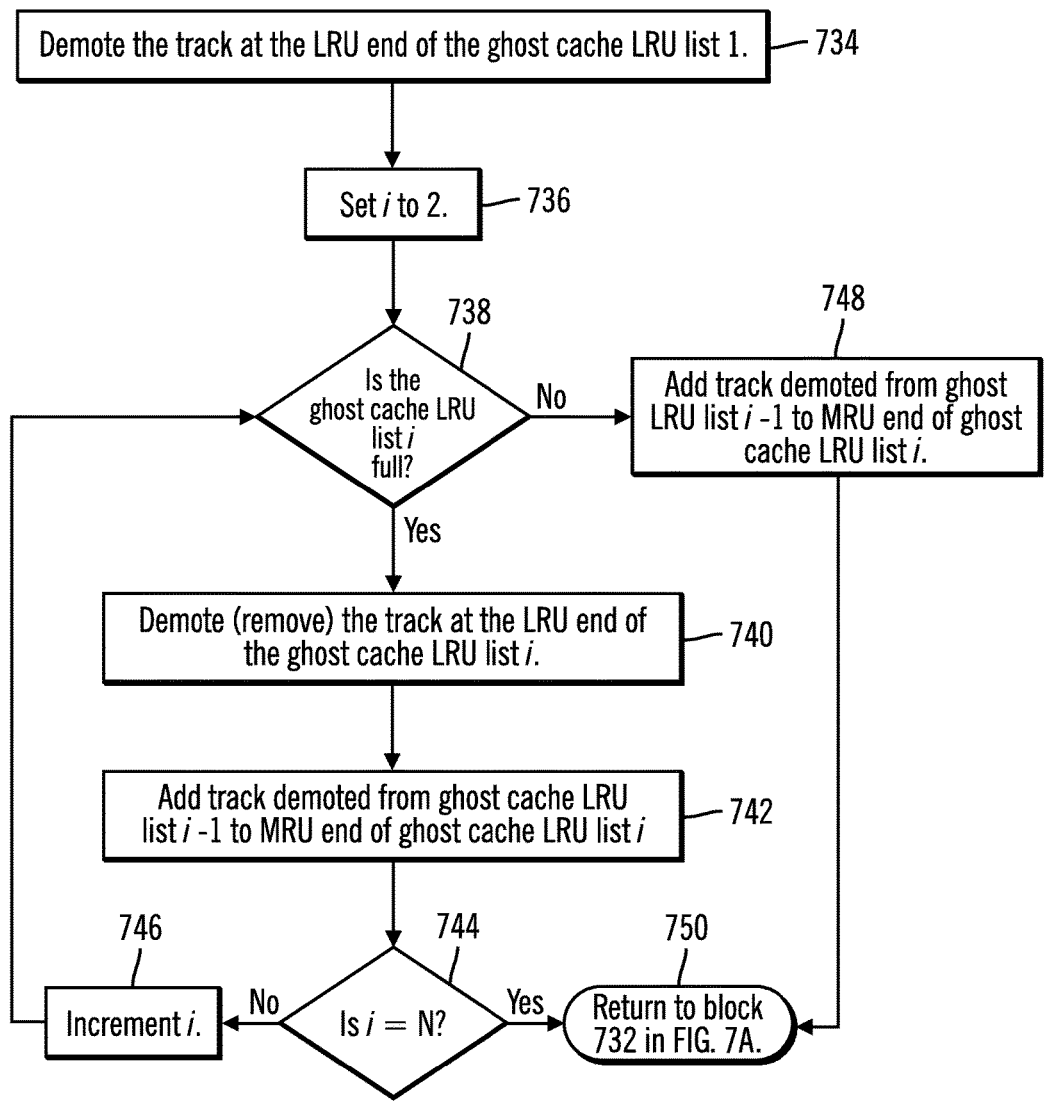

FIGS. 7a and 7b illustrate an embodiment of operations performed by the cache manager 124 to process a read request to a track in the storage 104. Upon receiving (at block 700) a read request to a track, if (at block 702) the track is indicated in the cache LRU list $200_C$, then the track is returned (at block 704) to the request from the cache 110 and the number of cache hits 502 is incremented (at block 706). The total time to service cache hits 508 is incremented (at block 708) by the time to return the requested track from the cache 110. Indication of the accessed track is moved (at block 710) to the MRU end 202 of the cache LRU list $200_C$.

If (at block 702) the track is not indicated in the cache LRU list $200_C$, then the track is accessed (at block 712) from the storage 104 to return to the request. The cache manager 124 increments (at block 714) the number of read misses 506 and increments (at block 716) the total time service cache misses 510 by the time to return the track from the storage 104. If (at block 718) the track is in one of the ghost cache LRU lists $200_1 \ldots 200_N$, then the cache manager 124 increments (at block 720) the number of ghost cache hits $504_i$ for the ghost cache LRU list $200i$ indicating the track because if cache space was provided to accommodate tracks in the ghost cache LRU lists $200_1$ through $200_i$ then there would have been a cache hit. Indication of the accessed track is removed (at block 721) from the ghost cache LRU list i indicating the track. From block 721 or if the track is not in one of the ghost cache LRU lists $200_1 \ldots 200_N$, if (at block 722) the cache LRU list $200_C$ is full, then the track at the LRU end 204 of the cache LRU list $200_C$ is demoted (at block 724) and discarded from the cache 110.

If (at block 726) the first ghost cache LRU list $200_1$ is not full, then the indication of the track demoted from the cache 110 is added (at block 728) from the LRU end 204 of the cache LRU list $200_C$ to the MRU 202 of the first ghost cache LRU list $200_1$. From block 728 or if (at block 722) the cache LRU list $200_C$ is not full, then the cache manager 122 adds (at block 730) the accessed track to the MRU end 202 of the cache LRU list $200_C$.

If (at block 726) the first ghost cache LRU list $200_i$ is full, then the ghost cache LRU lists $200_1 \ldots 200_N$ must be adjusted by demoting (removing) indication of a track from the LRU end 204 of one ghost cache LRU list $200i$ and adding the demoted track to the MRU end 202 of a next ghost cache LRU list $200_{i+1}$, until the last Nth ghost cache LRU list $200_N$ is reached, such that the track demoted from the LRU end 204 of the last ghost cache LRU list $200_N$ is demoted without adding to a further ghost cache LRU list. Control proceeds (at bock 732) to block 734 in FIG. 7b to move a track through the ghost cache LRU lists $200_1 \ldots 200_N$ when room needs to be made for a track demoted from the cache LRU list $200_C$.

If (at block 726) the first ghost cache LRU list $200_1$ is full and room needs to be made to accommodate the track being demoted from the cache LRU list $200_C$, then the cache manager 124 demotes (at block 734) the track at the LRU end 204 of the first ghost cache LRU list $200_1$. A variable i is set (at block 736) to two for the next ghost cache LRU list $200_2$ to start the cascade of demotions of tracks through the ghost cache LRU lists $200_1 \ldots 200_N$. If (at block 738) the ghost cache LRU list $200_i$ is full, then the cache manager 124 demotes (removes) (at block 740) the track at the LRU end 204 of the ghost cache LRU list $200_i$ and adds (at block 742) the track demoted from the ghost cache LRU list $200_{i-1}$ to the MRU end 202 of the ghost cache LRU list $200_i$. If (at block 744) i is not equal to N, i.e., there is another ghost cache LRU list $200_{i+1}$ to which a track demoted from the last considered ghost cache LRU list $200_i$ can be added, then i is incremented (at block 746) and control proceeds back to block 738 to move the track demoted from the last considered ghost cache LRU list to a further ghost cache LRU list.

If (at block 738) the ghost cache LRU list $200_i$ is not full, then the track demoted from the ghost cache LRU list $200_{i-1}$ is added (at block 748) to the MRU end 202 of the ghost cache LRU list $200_i$. From block 748 or if i is N, i.e., the last ghost cache LRU list $200_N$ was processed, then control proceeds (at block 750) back to block 732 in FIG. 7a.

With the described operations of FIGS. 7a and 7b, a track is demoted from one of the ghost cache LRU lists $200_i$ to make room to add a track demoted from the cache 110 or from a previous ghost cache LRU list $200_{i-1}$, so that a track demoted from the cache 110 moves sequentially through ghost cache LRU lists $200_1$ through $200_N$ to simulate how the track would be managed if the cache had additional memory to accommodate tracks indicated in the ghost cache LRU lists $200_1 \ldots 200_N$.

When adding a track to the cache 110, the cache control block $300_i$ for that address in the cache 110 would be updated to include information on the track and the entry in the cache LRU list $200_C$ indicating the track. Further, the track index 132 would be updated to include the cache control block index for the track in the cache 110. In one embodiment, if a track is indicated in a ghost cache LRU list $200_i$, there may be no cache control block created for the track and indicated in the cache control block directory 300. In an alternative embodiment, a full cache control block $300_i$ may be created in the cache control block directory 300 for the track indicated in the ghost cache LRU list $200_i$. In a still further alternative embodiment, a smaller ghost cache control block $400_i$ may be added to the cache control block directory 300 for the track indicated in the ghost cache LRU list $200_i$ having minimal information to identify the track in one of the ghost cache LRU lists $200_i$. When a track is moved from one ghost cache LRU list $200_i$ to a next ghost cache LRU list $200_{i+1}$, then the information in the cache control block, such as in the ghost cache LRU list 406 and LRU list entry 408, for that track would be updated to indicate the new location in the new ghost cache LRU list 406 to which the track is added. The cache control block index for the ghost cache control block $400_i$ may be added to the track index 132 for the track indicated in the ghost cache LRU list $200_i$.

With the described embodiments of FIGS. 7a and 7b, tracks demoted from the cache 110 and cache LRU list $200_C$ are added to the ghost cache LRU list $200_i$ where accesses to the track once removed from the cache 110 can be tracked as if the track is in the cache 110. These accesses to the track indicated on the ghost cache LRU lists $200_1 \ldots 200_N$ can be used to estimate the cache performance that would be realized if the cache 110 was expanded to accommodate the tracks indicate in the ghost cache LRU lists $200_1 \ldots 200_N$.

Figure 8:
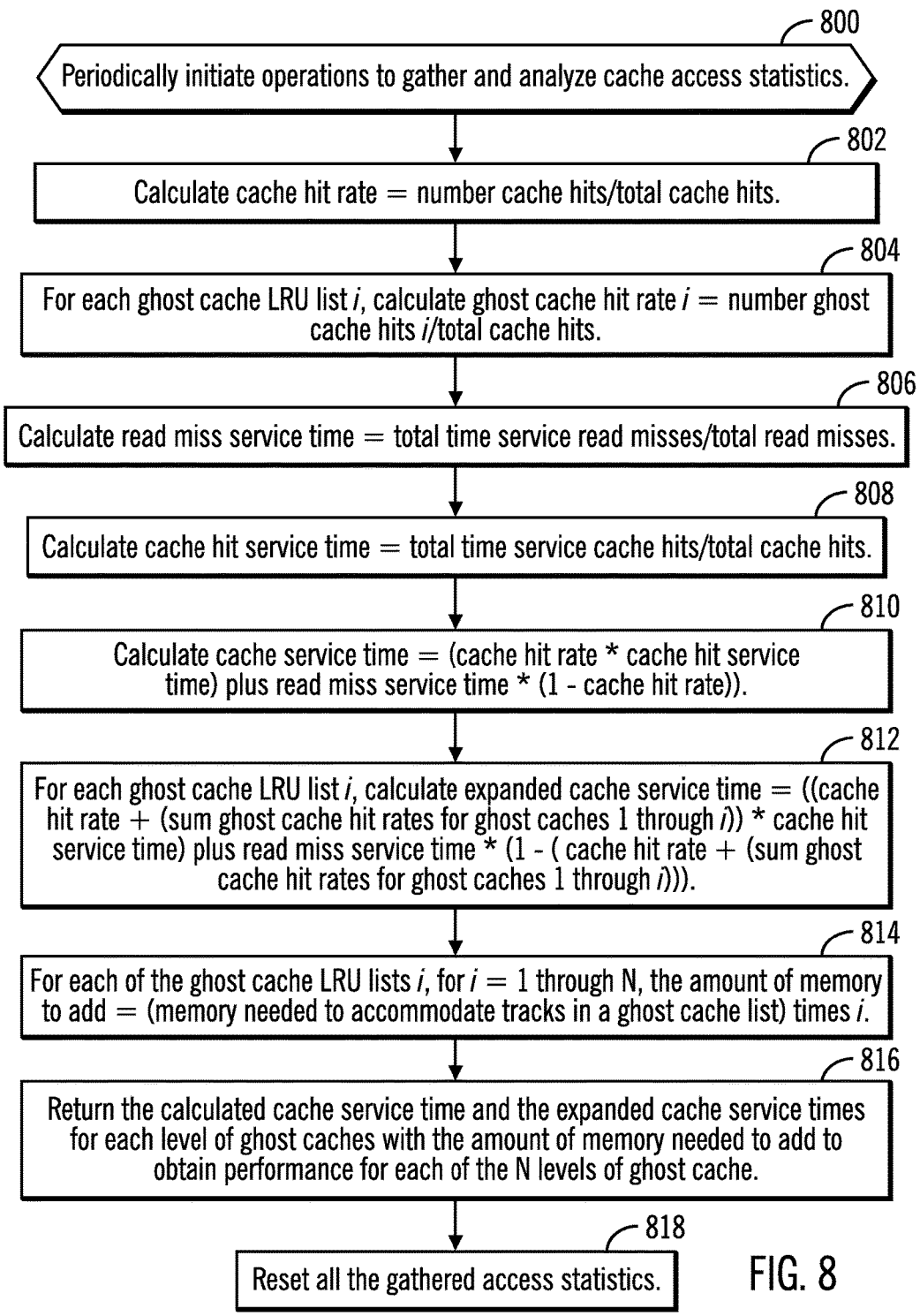
FIG. 8 illustrates an embodiment of operations to calculate cache access statistics.

FIG. 8 illustrates an embodiment of operations performed by the cache manager 124 (or some other component) to periodically initiate operations to gather and analyze cache access statistics. Upon initiating (at block 800) such operations, the cache manager 124 calculates (at block 802) the cache hit rate 602 as the number cache hits 502 divided by the total cache hits during the measurement time period. For each ghost cache LRU list i, for i equals 1 through N, a ghost cache hit rate $604_i$ is calculated (at block 804) as the number ghost cache hits $504_i$ for the ghost cache LRU list $200_i$ divided by the total cache hits during the measurement time period. The cache manager 124 calculates (at block 806) the read miss service time 608 as the total time service cache misses 510 divided by the total read misses 506. The cache hit service time 606 is calculated (at block 808) as the total time service cache hits 508 divided by the total cache hits 502.

The cache manager 124 may then calculate (at block 810) the cache service time 610 as follows:

(cache hit rate 602*cache hit service time 606)+read miss service time 608*(1−cache hit rate 602)

The cache manager 124 may then calculate (at block 812) N estimated expanded cache service times $612_1 \ldots 612_N$ if cache 110 was expanded to have space for each of the N levels of cache as represented by the N ghost cache LRU lists. The ith estimated expanded cache service time for the i ghost cache level may be calculated as follows:

((cache hit rate 602+(sum ghost cache hit rates $604_1$ through $604_i$))*cache hit service time 606)+read miss service time 608*(1−(cache hit rate 602+ (sum ghost cache hit rates $604_1$ through $600_i$))).

The cache manager 124 may further estimate (at bock 814) the amount of memory that needs to be added to expand the cache to attain the estimated cache service times, which for each ghost cache level i equals (the memory needed to add for a ghost cache LRU list) times i, the level or number of the cache level. Thus, the expanded cache service times for the different N levels of ghost caches can be achieved by adding the estimated amount of memory based on the cache level, e.g., 128 GB, 256 GB, 384 GB, 512 GB, etc.

The calculated cache service time 610 and the estimated N expanded cache service time $612_1 \ldots 612_N$ are returned (at block 816) for each of the N levels of ghost caches, along with the amount of memory needed to add to attain the performance for each of the N levels of ghost cache. The cache service time 610 indicates an average time to service requests when only the current cache 110 is used. The estimated expanded cache service time $612_i$ for ghost cache level i indicates an estimated time to service requests if the cache 110 is expanded to add the determined memory space for ghost cache level i (or i times the fixed amount of memory space added at each level). After performing all calculations, the gathered access statistics 500 are reset (at block 818).

FIG. 9 illustrates an example of the information that may be returned, including indicating a cache level, and for each cache level from the current cache to the Nth level, the cache service time 610 and the N expanded cache service times $612_1 \ldots 612_N$ are presented, along with an amount of memory for each ghost cache level i that needs to be added to attain the expanded cache service time $612_i$ for ghost cache level i. The user of the system 100 may review the information in FIG. 9 to determine whether the cost of adding the additional levels of memory would be worthwhile to attain the estimated cache service times. This information allows the system administrator to better determine how to budget hardware purchases by providing specific cache performance improvement information based on the actual workload of the system 100 to which the memory will be added.

Described embodiments discuss the use of N ghost cache LRU lists to consider the benefits of adding N different levels of memory to the cache 110. In an alternative embodiment, there may be only one ghost cache LRU list to consider the benefits of only increasing the cache size by one amount of memory capable of storing the tracks indicated in the one ghost cache LRU list.

In the described embodiment, the variable "i" when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
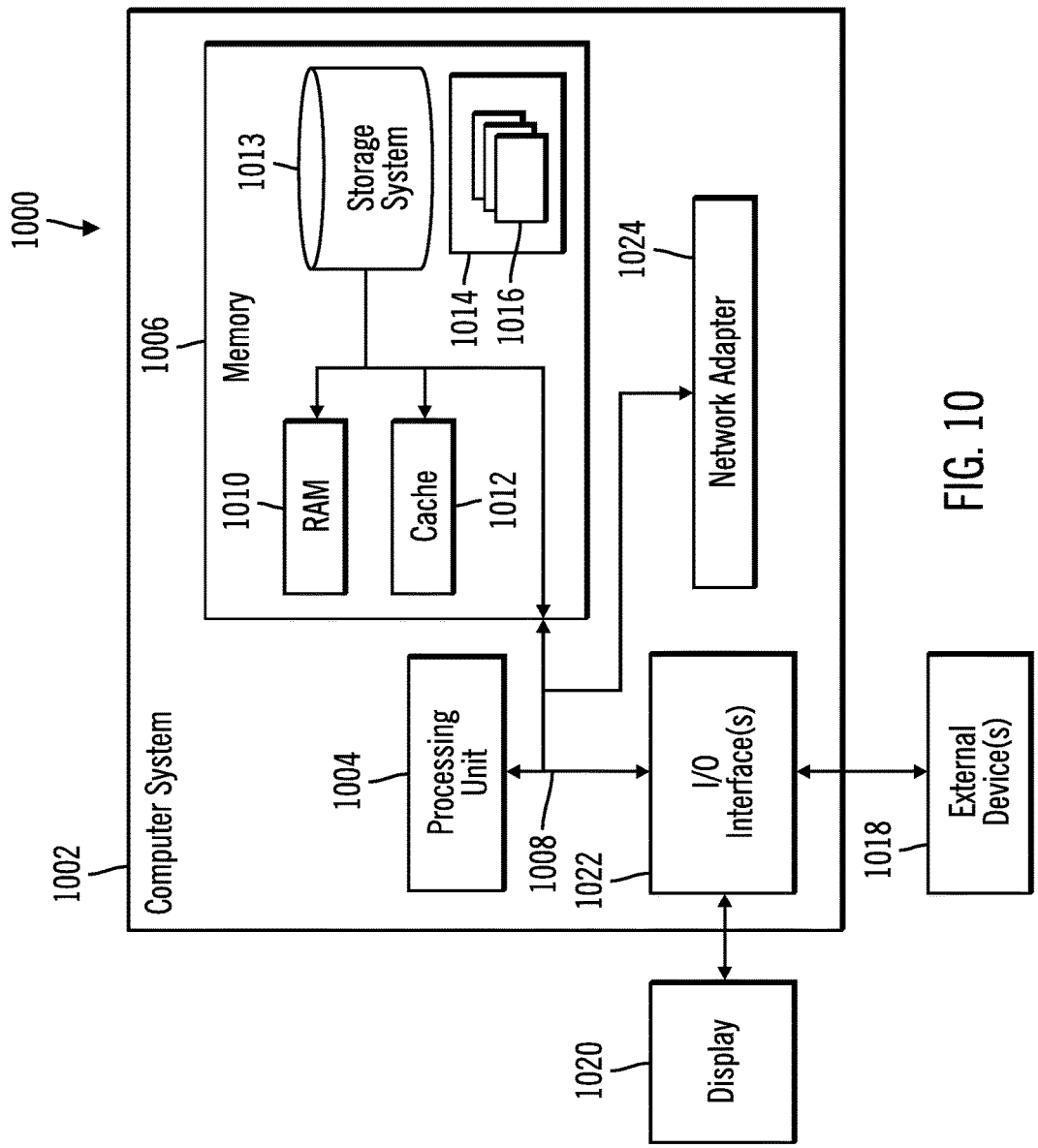
FIG. 10 illustrates a computing environment in which the components of FIG. 1 may be implemented.

The computational components of FIG. 1, including the hosts 118 and computing system 100 may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a cache in a computer system to cache tracks stored in a storage, the computer program product comprising a computer readable storage medium having computer readable program code embodied therein that when executed performs operations, the operations comprising:

indicating tracks in the cache in a cache list;

indicating a demoted track comprising a track demoted from the cache in a ghost cache list in response to demoting the demoted track in the cache, wherein the demoted track is not indicated in the cache list;

during caching operations, gathering information on a number of cache hits comprising accesses to the tracks indicated in the cache list and a number of ghost cache hits comprising accesses to tracks indicated in the ghost cache list; and using the gathered information on the number of cache hits and the number of ghost cache hits to generate information on cache performance improvements that would occur if the cache was increased in size to cache tracks in the ghost cache list by:

determining a cache service time based on the number of cache hits which indicates an estimated time to service an access request with the cache; and determining a ghost cache service time based on the number of cache hits and the number of ghost cache hits, which indicates an estimated time to service an access request if the cache was increased in size to have space to store the tracks indicated in the ghost cache list.

2. The computer program product of claim 1, wherein the tracks indicated in the ghost cache list are not stored in the cache.

3. The computer program product of claim 1, wherein the operations further comprise:

demoting a track indicated in the ghost cache list in response to the ghost cache list being full when another track is demoted from the cache to make an entry available in the ghost cache list to indicate the track being demoted from the cache.

4. The computer program product of claim 1, wherein the operations further comprise:

providing a cache control block directory including a cache control block for each track indicated in the cache list and a ghost cache control block for each track indicated in the ghost cache list, wherein the ghost cache control block includes less information than maintained in the cache control block.

5. A computer program product for managing a cache in a computer system to cache tracks stored in a storage, the computer program product comprising a computer readable storage medium having computer readable program code embodied therein that when executed performs operations, the operations comprising:

providing a plurality of N ghost cache lists ordered from 1 to N;

indicating tracks in the cache in a cache list;

indicating demoted tracks comprising tracks demoted from the cache in ghost cache list 1, wherein the demoted track is not indicated in the cache list;

for ghost cache lists 2 through N, indicating in ghost cache list i a track demoted from the ghost cache list (i-1);

during caching operations, gathering information on a number of cache hits comprising accesses to tracks indicated in the cache list and a number of ghost cache hits comprising accesses to tracks indicated in the N ghost cache lists; and using the gathered information on the number of cache hits and the number of ghost cache hits to generate information to determine N cache performance improvements that would occur if the cache was increased in size to cache tracks in the ghost cache lists.

6. The computer program product of claim 5, wherein the operations further comprise:

demoting a track indicated in the ghost cache list 1 in response to the ghost cache list 1 being full when a track is demoted from the cache to make an entry available in the ghost cache list 1 to indicate the track being demoted from the cache; and for ghost cache lists 2 through N, demoting a track indicated in the ghost cache list i in response to the ghost cache list i being full when a track is demoted from the ghost cache list (i-1) to make an entry available in the ghost cache list i to indicate the track being demoted from the ghost cache list (i-1).

7. The computer program product of claim 5, wherein the operations further comprise:

incrementing a number of cache hits in response to receiving an access request to a track indicated in the cache list; and for each of the N ghost cache lists, incrementing a number of ghost cache hits for ghost cache list i in response to receiving an access request to a track indicated in the ghost cache list i.

8. The computer program product of claim 7, wherein the using the gathered information comprises:

determining a cache service time based on the number of cache hits which indicates an estimated time to service an access request with the cache; and for each of the N ghost cache lists, determining a ghost cache service time i for ghost cache list i based on the number of cache hits and the number of ghost cache hits to ghost cache lists 1 though i, which indicates an estimated time to service an access request if the cache was increased in size to have space to store the tracks indicated in the ghost cache lists 1 though i.

9. The computer program product of claim 8, wherein the determining the cache service time comprises using a cache hit rate, calculated by dividing the number of cache hits by a total number of cache accesses, and a read miss service time, and wherein the determining for each of the N ghost cache lists the ghost cache service time i comprises using a ghost cache hit rate i calculated by dividing the number of cache hits to ghost cache list i by a total number of accesses to tracks indicated in ghost cache list i, the ghost cache hit rate i, and the read miss service time.

10. The computer program product of claim 9, wherein the determining the cache service time comprises (the cache hit rate times a cache hit service time) plus the (read miss service time) times (1 minus the cache hit rate); and wherein for each of the N ghost cache lists, the determining the ghost cache service time i for ghost cache list i comprises ((the cache hit rate plus a sum of the ghost cache hit rates 1 through i) times a cache hit service time) plus the (read miss service rate) times (1 minus (the cache hit rate plus a sum of the ghost cache hit rates 1 through i) times a cache hit service time).

11. A system coupled to a storage having tracks, comprising:

a processor;

a cache implemented in at least one memory device; and a computer readable storage medium having computer program code that in response to being executed by the processor performs operations, the operations comprising:

indicating tracks in the cache in a cache list;

indicating a demoted track comprising a track demoted from the cache in a ghost cache list in response to demoting the demoted track in the cache, wherein the demoted track is not indicated in the cache list;

during caching operations, gathering information on a number of cache hits comprising accesses to tracks indicated in the cache list and a number of ghost cache hits comprising accesses to tracks indicated in the ghost cache list; and using the gathered information on the number of cache hits and the number of ghost cache hits to generate information on cache performance improvements that would occur if the cache was increased in size to cache tracks in the ghost cache list by:

determining a cache service time based on the number of cache hits which indicates an estimated time to service an access request with the cache; and determining a ghost cache service time based on the number of cache hits and the number of ghost cache hits, which indicates an estimated time to service an access request if the cache was increased in size to have space to store the tracks indicated in the ghost cache list.

12. A system coupled to a storage having tracks, comprising:

a processor;

a cache implemented in at least one memory device; and a computer readable storage medium having computer program code that in response to being executed by the processor performs operations, the operations comprising:

providing a plurality of N ghost cache lists ordered from 1 to N;

indicating tracks in the cache in a cache list;

indicating tracks demoted from the cache in ghost cache list 1, wherein the demoted track is not indicated in the cache list;

for ghost cache lists 2 through N, indicating in ghost cache list i a track demoted from the ghost cache list (i−1);

during caching operations, gathering information on a number of cache hits comprising accesses to tracks indicated in the cache list and a number of ghost cache hits comprising accesses to tracks indicated in the ghost cache list; and using the gathered information on the number of cache hits and the number of ghost cache hits to generate information to determine N cache performance improvements that would occur if the cache was increased in size to cache tracks in the ghost cache lists.

13. The system of claim 12, wherein the operations further comprise:

demoting a track indicated in the ghost cache list 1 in response to the ghost cache list 1 being full when a track is demoted from the cache to make an entry available in the ghost cache list 1 to indicate the track being demoted from the cache; and for ghost cache lists 2 through N, demoting a track indicated in the ghost cache list i in response to the ghost cache list i being full when a track is demoted from the ghost cache list (i−1) to make an entry available in the ghost cache list i to indicate the track being demoted from the ghost cache list (i−1).

14. The system of claim 12, wherein the operations further comprise:

incrementing a number of cache hits in response to receiving an access request to a track indicated in the cache list; and for each of the N ghost cache lists, incrementing a number of ghost cache hits for ghost cache list i in response to receiving an access request to a track indicated in the ghost cache list i.

15. The system of claim 14, wherein the using the gathered information comprises:

determining a cache service time based on the number of cache hits which indicates an estimated time to service an access request with the cache; and for each of the N ghost cache lists, determining a ghost cache service time i for ghost cache list i based on the number of cache hits and the number of ghost cache hits to ghost cache lists 1 though i, which indicates an estimated time to service an access request if the cache was increased in size to have space to store the tracks indicated in the ghost cache lists 1 though i.

16. A method implemented in a computer system for managing a cache in the computer system to cache tracks stored in a storage, comprising:

indicating tracks in the cache in a cache list;

indicating a demoted track comprising a track demoted from the cache in a ghost cache list in response to demoting the demoted track in the cache, wherein the demoted track is not indicated in the cache list;

during caching operations, gathering information on a number of cache hits comprising accesses to tracks indicated in the cache list and a number of ghost cache hits comprising accesses to tracks indicated in the ghost cache list; and using the gathered information on the number of cache hits and the number of ghost cache hits to generate information on cache performance improvements that would occur if the cache was increased in size to cache tracks in the ghost cache list by:

determining a cache service time based on the number of cache hits which indicates an estimated time to service an access request with the cache; and determining a ghost cache service time based on the number of cache hits and the number of ghost cache hits, which indicates an estimated time to service an access request if the cache was increased in size to have space to store the tracks indicated in the ghost cache list.

17. A method implemented in a computer system for managing a cache in the computer system to cache tracks stored in a storage, comprising:

providing a plurality of N ghost cache lists ordered from 1 to N;

indicating tracks in the cache in a cache list;

indicating demoted tracks comprising tracks demoted from the cache in ghost cache list 1;

for ghost cache lists 2 through N, indicating in ghost cache list i a track demoted from the ghost cache list (i−1);

during caching operations, gathering information on a number of cache hits comprising accesses to tracks indicated in the cache list and a number of ghost cache hits comprising accesses to tracks indicated in the N ghost cache lists; and using the gathered information on the number of cache hits and the number of ghost cache hits to generate information to determine N cache performance improvements that would occur if the cache was increased in size to cache tracks in the ghost cache lists.

18. The method of claim 17, further comprising:

demoting a track indicated in the ghost cache list 1 in response to the ghost cache list 1 being full when a track is demoted from the cache to make an entry available in the ghost cache list 1 to indicate the track being demoted from the cache; and for ghost cache lists 2 through N, demoting a track indicated in the ghost cache list i in response to the ghost cache list i being full when a track is demoted from the ghost cache list (i−1) to make an entry available in the ghost cache list i to indicate the track being demoted from the ghost cache list (i−1).

19. The method of claim 17, further comprising:

incrementing a number of cache hits in response to receiving an access request to a track indicated in the cache list; and for each of the N ghost cache lists, incrementing a number of ghost cache hits for ghost cache list i in response to receiving an access request to a track indicated in the ghost cache list i.

20. The method of claim 19, wherein the using the gathered information comprises:

determining a cache service time based on the number of cache hits which indicates an estimated time to service an access request with the cache; and for each of the N ghost cache lists, determining a ghost cache service time i for ghost cache list i based on the number of cache hits and the number of ghost cache hits to ghost cache lists 1 though i, which indicates an estimated time to service an access request if the cache was increased in size to have space to store the tracks indicated in the ghost cache lists 1 though i.

* * * * *